Patented July 17, 1951

2,560,694

UNITED STATES PATENT OFFICE 2,560,694

BROMATE ION-SULFOXY COMPOUND CATALYST SYSTEM IN AQUEOUS POLYMERIZATION PROCESS

Edward G. Howard, Jr., Wilmington, Del., assignor to E. I. du Pont de Nemours and Company, Wilmington, Del., a corporation of Delaware No Drawing. Application July 15, 1950,
Serial No. 174,129

3 Claims. (Cl. 260—80)

This invention relates to the addition polymerization of polymerizable organic compounds and more particularly to new polymerization catalyst systems.

Polymerization of ethylenically unsaturated compounds is a process of great technical importance. The systems in use are in general effective only at temperatures moderately elevated. However, when polymerization can be conducted at temperatures lower than room temperature it has frequently been found that the products obtained have superior physical properties which are of substantial economic importance, such as, for example, the increased abrasion resistance of synthetic rubbers prepared at temperatures which are low.

This invention has as an object the provision of new polymerization processes. A further object is the provision of new initiator systems effective at room temperature and below. A further object is a new and improved system of low temperature addition polymerization in high conversion. Other objects will appear hereinafter.

These objects are accomplished by the present invention wherein an ethenoid monomer subject to addition polymerization by reason of a non-aromatic carbon to carbon double bond is polymerized at low temperatures and at a rapid rate by bringing the monomer in contact in aqueous dispersion with a water soluble, oxidizable sulfoxy compound of the class consisting of inorganic bisulfites, aliphatic aldehyde bisulfite adducts, sulfinites, inorganic thiosulfates, and sulfoxylates and bromate ion, said oxidizable sulfoxy compound being present in molar excess of said bromate ion.

The following examples in which parts are by weight are illustrative of the invention.

Example I

A glass container was charged with 220 parts of water, 13.2 parts of acrylonitrile, 0.073 part of sodium bisulfite, and 0.63 part of a solution of 0.25 molar potassium bromate. The vessel and contents were maintained at 0° C. for one hour at the end of which time 6.3 parts of polyacrylonitrile was obtained. This corresponds to a 48% yield.

When potassium chlorate was substituted for the bromate in the above general procedure, no polymer was obtained. Neither potassium chlorate nor potassium iodate gave any polymer at a higher temperature (25° C.).

Example II

A glass vessel was charged with 220 parts of water, 13.2 parts of acrylonitrile, 0.27 part of formamidinesulfinic acid, 5 parts of 5 molar hydrochloric acid, and 0.42 part of potassium bromate. At the end of four hours at 25° C. a 90% yield of polymer was obtained.

When potassium chlorate was substituted for the bromate in the above procedure, no polymer was obtained.

Example III

A charge consisting of 220 parts of water, 13.2 parts of acrylonitrile, 5 parts of a water solution of 0.5 molar sodium thiosulfate, 2.5 parts of 0.5 molar hydrochloric acid, and 2.5 parts of aqueous 0.25 molar potassium bromate was heated for one hour at 25° C. There was obtained 4 parts of polymer corresponding to a 30% conversion.

When potassium chlorate was substituted for the bromate, only 0.1 part of polymer was obtained. When potassium iodate was employed, only a trace of polymer resulted. When 0.15 part of acetic acid was substituted for the hydrochloric acid and the time increased to 24 hours with bromate, a 62% yield of polymer resulted.

Example IV

When the general procedure of Example III was repeated except that 0.3 part of sodium formaldehydesulfoxylate was employed in place of the sodium thiosulfate, a 58% yield of polymer was obtained.

When potassium chlorate was substituted for the bromate, only a trace of polymer was obtained. When potassium iodate was employed, no polymer resulted.

When the temperature was lowered to −25° C. and the water was replaced by an ethyl alcohol/water mixture (40/42 ratio), in two hours a 32% conversion to polymer was obtained.

Example V

A vessel was charged with 210 parts of water, 13.2 parts of acrylonitrile, 0.41 part of sodium benzenesulfinate, 5 parts of an aqueous solution of 0.25 molar potassium bromate, and 10 parts of a 0.5 molar hydrochloric acid solution. After 17 hours at 25° C. 8.5 parts of polymer was obtained corresponding to a 64% yield.

When potassium chlorate was substituted for the bromate, no polymer was obtained.

Example VI

A charge consisting of 220 parts of water, 13.2 parts of acrylonitrile, 0.12 part of the sodium bisulfite addition product of isobutyraldehyde, and 6.3 parts of an aqueous solution of 0.025 molar potassium bromate was heated for one hour at 25° C. There was obtained a 59% yield of polymer.

Example VII

A solution containing 12.5 parts of methyl methacrylate, 40 parts of ethyl alcohol, 48 parts of water, 0.1 part of sodium bisulfite, 1.3 parts of an aqueous solution of 0.025 molar potassium bromate, and 0.11 part of monosodium dihydrogen phosphate was maintained at 25° C. for one hour. A 45% yield of polymethyl methacrylate was obtained.

Example VIII

Into a glass vessel was placed 47 parts water, 55 parts of ethyl alcohol, 0.26 part of sodium bisulfite, 0.34 part of sodium acetate trihydrate, 2.5 parts of an aqueous solution of 0.25 molar potassium bromate, and 15.6 parts of vinyl chloride. After one hour at 0° C. 11.9 parts of polyvinyl chloride was obtained. This corresponds to a 76% conversion.

When potassium bromate in the above procedure was replaced by potassium chlorate, no polymer was obtained.

Example IX

When a glass vessel containing 50 parts of water, 55 parts of ethyl alcohol, 0.27 part of formamidinesulfinic acid, 5 parts of 0.5 molar hydrochloric acid, 0.42 part of potassium bromate, and 15.6 parts of vinyl chloride was maintained at 25° C. for two hours, there was obtained 7.6 parts of polyvinyl chloride corresponding to a 49% conversion.

When potassium bromate was replaced by potassium chlorate, only 0.8 part of polymer was obtained.

Example X

When the general procedure of Example VIII was repeated except that 0.3 part of sodium formaldehydesulfoxylate was employed in place of the sodium bisulfite, 5.1 parts of polyvinyl chloride corresponding to a 33% yield was obtained.

Example XI

A solution of 120 parts (2.26 moles) of acrylonitrile in 1440 parts of water was cooled to 0° C. in an ice-salt bath. Air was removed from the reaction flask by sweeping the nitrogen and 12.6 parts (0.15 mol) of beta-methylene-beta-propiolactone was added (mol ratio 15/1). To this mixture was added 100 parts of a 1/10 molar solution of sodium formaldehydesulfoxylate (0.416 mole percent), 50 parts of 1/10 molar potassium bromate (0.208 mole percent) and 9.6 parts of 1 M sulfuric acid (0.40 mole percent). Polymerization started immediately and the reaction mixture was stirred under nitrogen for four hours, filtered, washed with water and methanol and dried. The white amorphous copolymer obtained weighed 73 parts after drying for 15 hours in a vacuum oven at 70° C. The polymer contained 25.23% nitrogen which corresponds to a beta-methylene-beta-propiolactone content of 4.5% or an acrylonitrile/beta-methylene-beta-propiolactone ratio of 33/1. The inherent viscosity of the polymer measured at 0.2% concentration in dimethylformamide solution was 1.49.

Example XII

A pressure vessel was charged with 150 parts of 2-chlorobutadiene, 1.5 parts of dodecyl mercaptan, 260 parts of water, 9 parts of potassium oleate, 2.26 parts of sodium acetate trihydrate, 1.77 parts of sodium bisulfite, and 25 parts of methanol. Over a fifty-minute period at 0° C. 17 parts of an aqueous solution of 0.25 molar potassium bromate was added. After an additional 65 minutes the polymerization was stopped and the polymer isolated. There was obtained 7.5 parts of an elastic soluble polymer.

The process of this invention is of generic application to the addition polymerization of polymerizable compounds having the non-aromatic, or ethylenic, $>C=C<$ group. It is particularly applicable to monomeric unsaturated polymerizable compounds in which the unsaturation is due to a terminal ethylenic group which is attached to a negative radical. It is thus applicable to polymerizable vinylidene compounds, including vinyl compounds, and particularly preferred are those which contain the $CH_2=C<$ group.

Compounds having a terminal methylene which are subject to polymerization and copolymerization with the initiators of this invention include olefins, e. g., ethylene and isobutylene; acrylyl and alkacrylyl compounds, e. g., acrylonitrile, methyl acrylate, ethyl methacrylate, methacrylic acid, and methacrylamide; vinyl and vinylidine halides, e. g., vinyl chloride and vinylidene chloride; vinyl carboxylates, e. g., vinyl acetate and vinyl trimethylacetate; vinyl imides, e. g., N-vinylphthalimide; N-vinyllactams, e. g., N-vinylcaprolactam; vinyl acryls such as styrene and other vinyl derivatives such as the vinylpyridines, methyl vinyl ketone and vinyl ethyl ether.

Fluoroethylenes, including vinyl fluoride, tetrafluoroethylene, chlorotrifluoroethylene and 1,1-dichloro-2,2-difluoroethylene may be polymerized and copolymerized by the process of this invention.

Polymerizable compounds that have a plurality of ethylenic double bonds that similarly may be polymerized or copolymerized include those having conjugated double bonds, such as butadiene and 2-chlorobutadiene, and compounds which contain two or more double bonds which are isolated with respect to each other, such as ethylene glycol dimethacrylate, methacrylate anhydride, diallyl maleate and divinyl benzene.

In addition to copolymers obtainable from the classes of monomers mentioned above, the copolymerization of fumaric or maleic esters, sulfur dioxide, acetylene, and carbon monoxide, with types of monomers mentioned, may be effected by the process of this invention. Furthermore, the term "polymerization" includes within its scope (in addition to the polymerization of a monomer alone or of two or more monomers, i. e., copolymerization) the polymerization of unsaturated monomers in the presence of a chain transfer agent, e. g., carbon tetrachloride. This latter process has been called "telomerization" and is further disclosed in U. S. 2,440,800.

This invention is applicable to the polymerization of any unsaturated compound subject to addition polymerization by prior techniques. Optimum conditions may vary from monomer to monomer, and since liquid phase polymerization is desired, gases such as ethylene and propylene require pressure.

The polymerizations are usually carried out at −25° C. to 60° C. and preferably at 0–35° C. Temperatures may be lower; however, the rate of polymerization is generally low. Higher temperatures may be used particularly when the time of polymerization is to be kept at a minimum, e. g., in a continuous process. In general the time required for substantial polymerization depends upon other variables, such as the specific temperature and concentrations of monomer catalyst, etc. Times of from one to twenty-four hours are customarily employed although the polymerization may require only a few minutes.

The polymerization may be carried out by conventional means in aqueous systems in which the catalyst, monomer, and diluent are preferably uniformly distributed, e. g., solutions or emulsions.

The bromate ion is generally present in amounts of 0.01 to 3% based on the weight of polymerizable monomer. Suitable sources of bromate ion are the alkali metal salts such as the sodium or potassium salt.

The process of this invention is of generic applicability to water soluble sulfoxy compounds of the class consisting of inorganic bisulfites, aliphatic aldehyde bisulfite adducts, sulfinites, inorganic thiosulfates, and sulfoxylates. Thus, the present invention is operative with the sulfites, e. g., sodium metabisulfite and sodium bisulfite; the bisulfite addition products with lower, generally 1–4 carbon, aliphatic aldehyde (preferably alkanals) including the sodium bisulfite adduct of butyraldehyde; thiosulfates; sulfinic compounds including sodium formaldehydesulfoxylate, formanidinesulfinic acid and aryl sulfinates such as sodium benzenesulfinate. The amount of oxidizable sulfoxy compound present may vary within wide limits but is generally present in amounts of from 0.01 to 10% based on the weight of the polymerizable monomer. The oxidizable sulfoxy compound should be present in larger amounts, on a molar basis, than the bromate ion generally varying from 10:1 to 1:1.

As illustrated by the examples, the process of this invention results in rapid polymerizations of polymerizable monomers at low temperatures.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the addition polymerization of monomers subject to addition polymerization by reason of a non-aromatic carbon-carbon double bond, the improvement wherein said monomer is polymerized by bringing the same in contact, in aqueous dispersion, with bromate ion and, in molar excess of said ion, a water soluble, oxidizable sulfoxy compound of the class consisting of inorganic bisulfites, aliphatic aldehyde bisulfite adducts, sulfinites, inorganic thiosulfates, and sulfoxylates.

2. In the addition polymerization of monomers subject to addition polymerization by reason of a non-aromatic carbon-carbon double bond, the improvement wherein said monomer is ploymerized by bringing the same in contact, in aqueous dispersion, with bromate ion and, in molar excess of said ion, a water soluble bisulfite.

3. In the addition polymerization of monomers subject to addition polymerization by reason of a non-aromatic carbon-carbon double bond, the improvement wherein said monomer is polymerized by bringing the same in contact, with an aqueous dispersion containing bromate ion and, in molar excess of said ion, bisulfite ion.

EDWARD G. HOWARD, Jr.

No references cited.